Jan. 7, 1969   A. W. KINGSTON   3,420,604
SOUND FILM APPARATUS

Filed July 23, 1965   Sheet 3 of 5

INVENTOR
Arthur W. Kingston
BY Kemon, Palmer
Stewart & Estabrook
ATTORNEYS

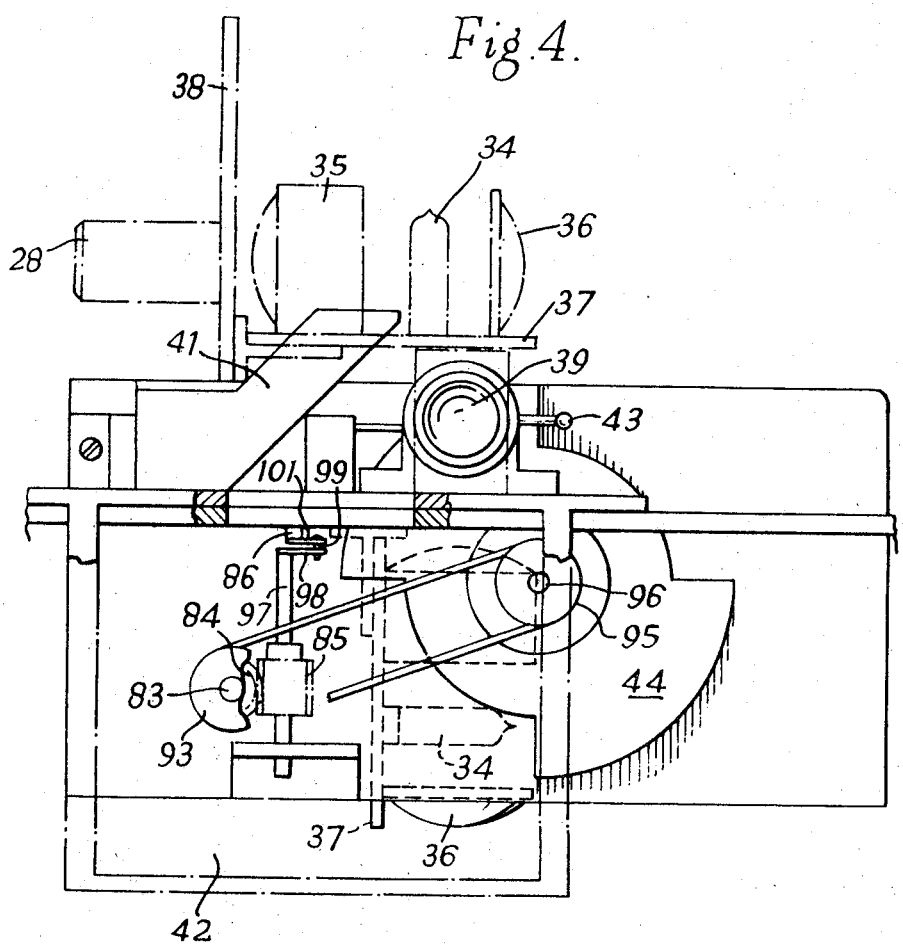

United States Patent Office 3,420,604
Patented Jan. 7, 1969

3,420,604
SOUND FILM APPARATUS
Arthur W. Kingston, The Old Mill House,
Willowbank, Denham, England
Filed July 23, 1965, Ser. No. 474,364
Claims priority, application Great Britain, July 28, 1964;
30,000/64; Oct. 20, 1964, 42,805/64
U.S. Cl. 352—26      12 Claims
Int. Cl. G03b 1/22

ABSTRACT OF THE DISCLOSURE

A sound film projector using a cassette and having a capstan for drawing the film past a sound head after leaving a film sprocket, the sprocket being driven by a motor through a resilient coupling and the capstan being driven by the same motor through a friction drive which allows a synchronous drive to be achieved by slippage in the friction drive. A film advancing claw member is driven by the said motor through a cam rotating in an aperture in a driving element carrying the claw. The advancement of the film being effected by a straight line movement of the claw to avoid a sawing action on the film perforations.

---

The film must be advanced intermittently through a film gate and must be moved smoothly past an optical or magnetic sound head. To isolate the film passing the sound head from the intermittent motion through the film gate a driving sprocket can be introduced which simultaneously feeds the film towards the film gate and draws it away from the film gate at the same rate to maintain a loop of film of constant length for the film gate traction mechanism to operate upon. There remains the difficulty of achieving synchronism betwen the sprocket and the drive system drawing the film past the sound head and of ensuring a uniform speed of travel past the sound head.

In accordance with the present invention there is provided cine apparatus including a sound head, a film driving sprocket before the head, a driving capstan after the head, means for pressing the film against the driving capstan, and a motor driving the sprocket and capstan, the sprocket being driven through a resilient coupling and the capstan through peripheral frictional engagement between two rotary transmission elements and the arrangement being such that the peripheral speed of the capstan in the absence of the film is higher that of the sprocket, the difference being taken up by slip between the said transmission elements when the film is being driven.

Preferably one of the transmission elements is a shaft of the motor which rotates at high speed and the other is an idler wheel having a peripheral surface of rubber or similar material having a high coefficient of friction. The idler wheel can engage a further wheel on the shaft of the capstan which preferably carries a small flywheel.

The motor may also drive a shutter and a pull-down mechanism associated with a film gate. The pull-down mechanism for advancing the film intermittently through the film gate preferably comprises a rotary cam engaging in a square aperture in an element coupled to a film-engaging claw in such a manner as to impart a substantially square movement to the claw. The said element can be a pivoted lever capable of limited sliding movement with respect to its pivot in a direction parallel to one pair of sides of the square aperture and swingable about the pivot by engagement of the cam with the said sides, the claw being carried by the lever.

Figure 1:
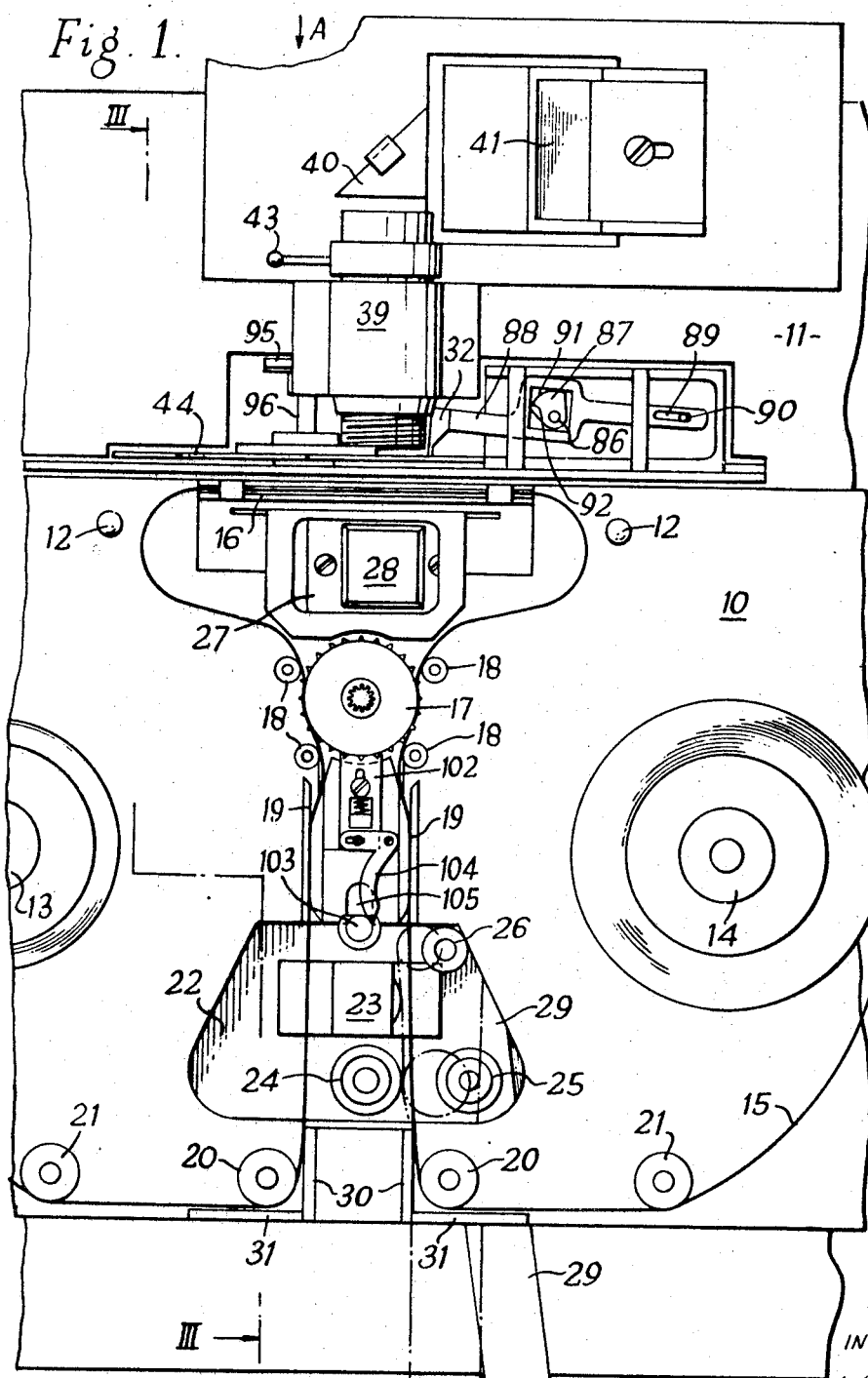
Figure 2:
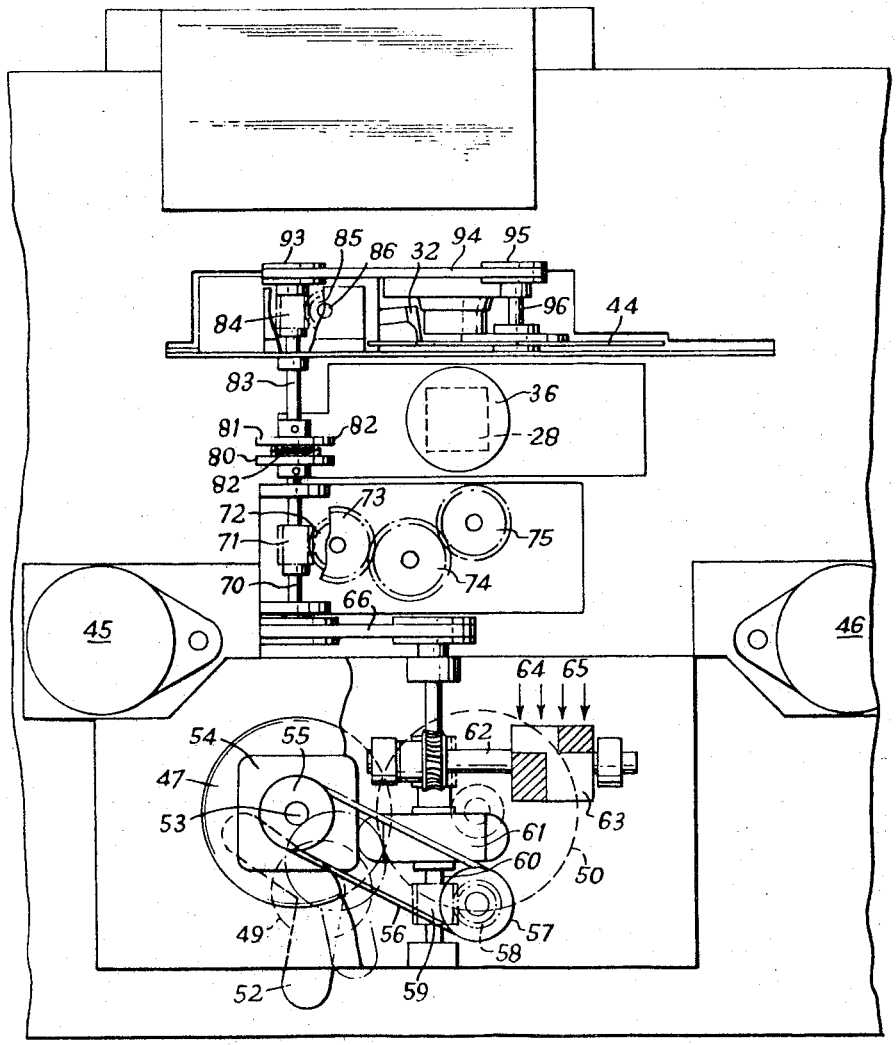
Figures 3, 3A:
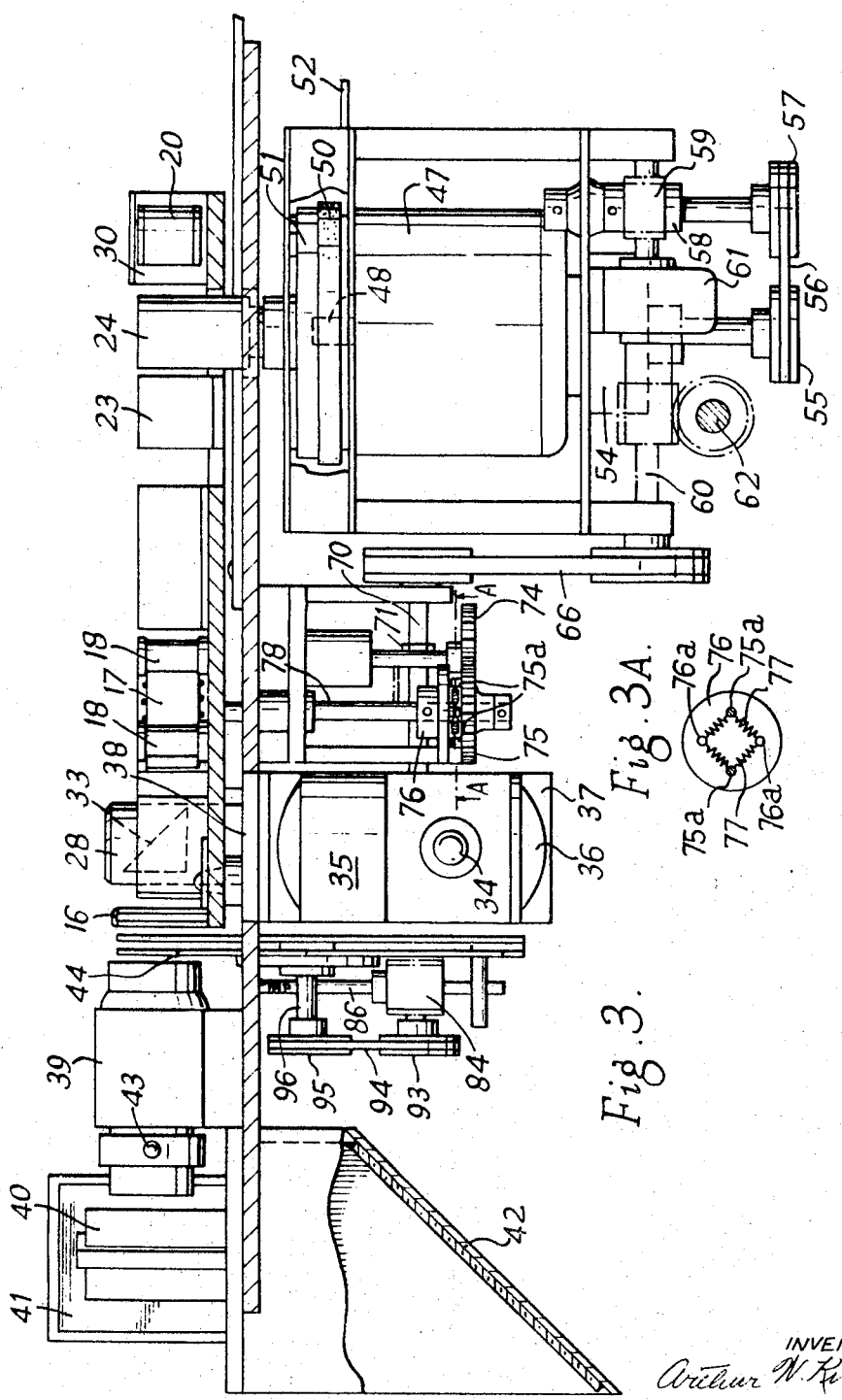
Figure 5:
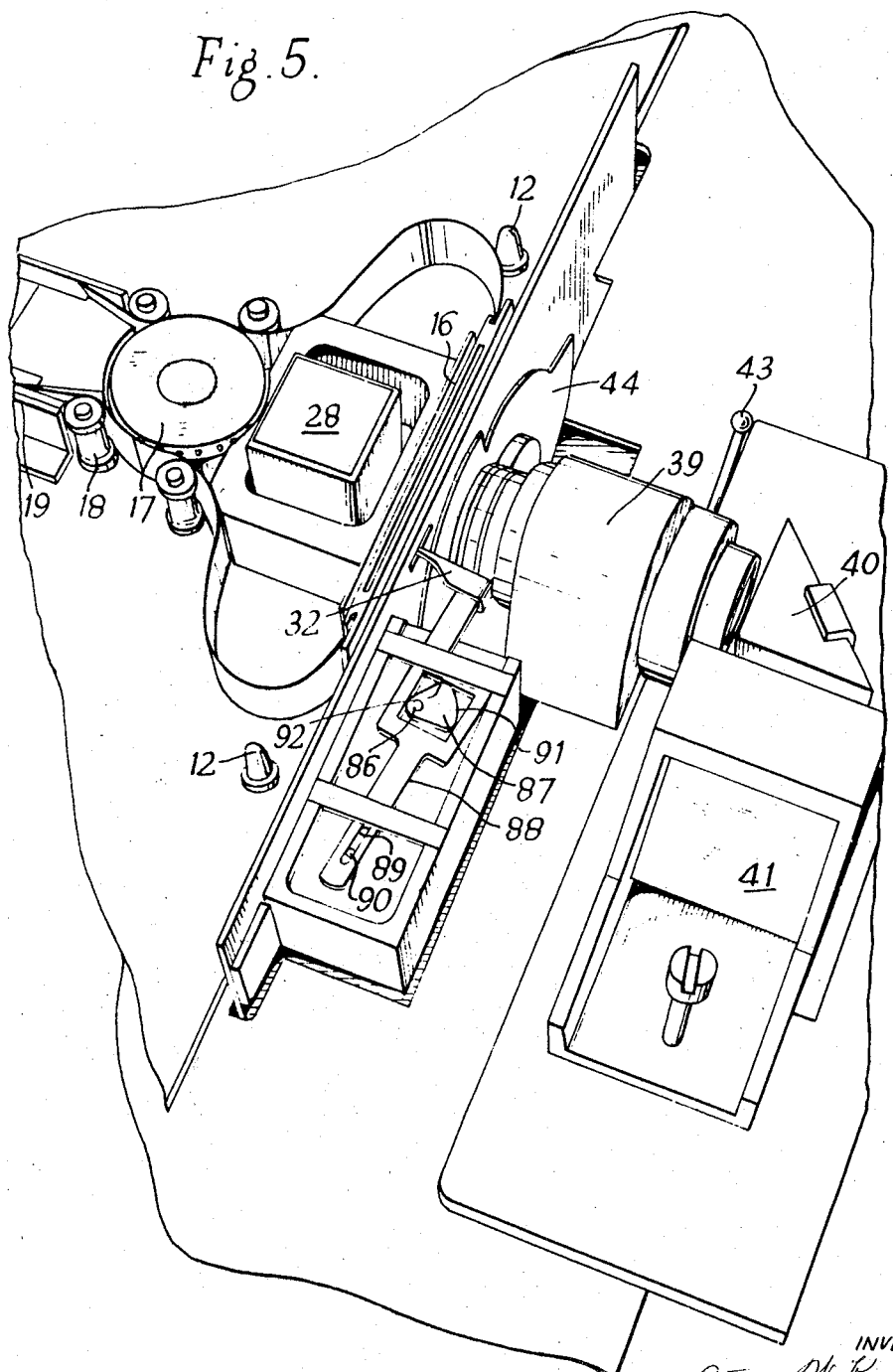

The invention will now be described in more detail with the aid of an example illustrated in the accompanying drawings in which FIG. 1 is a general plan view of a sound film projection apparatus with a cassette, the upper side of the cassette having been removed to show the interior, FIG. 2 is a general view from below showing the driving mechanism mounted below the deck of the apparatus, FIG. 3 is a sectional view on the line III—III of FIG. 1, FIG. 3A is a section on the line A—A of FIG. 3 showing the details of a resilient coupling, FIG. 4 is a detail of the projection system and shutter seen in the direction of the arrow A in FIG. 1, and FIG. 5 is a general perspective view of the film gate, projection system and claw mechanism.

FIG. 1 shows the cassette 10 mounted on a deck or platform 11 of the projector. Two locating pins 12 projecting from the deck 11 and engaging openings in the lower wall of the cassette 10 serve to position the cassette on the deck. The cassette 10 contains two bobbins 13 and 14 to which the ends of a strip of film 15 are attached and on which the strip 15 is wound. The cassette also contains a film gate 16, a driving sprocket 17 with associated guide rollers 18, guide channels 19 and guide rollers 20 and 21. An opening 22 in the walls of the cassette allows for the entry of a magnetic sound reproducing head 23, a driving capstan 24, a pressure roller 25, and a film edge guide 26. A second opening 27 allows for the entry of a reflector 28 forming part of the projection system for projecting the film passing through the film gate 16.

The pressure roller 25 and the edge guide 26 are carried on a lever 29 whose disengaged position is shown in full lines and whose engaged position is shown in broken lines. The guide rollers 20 are each positioned in a corner between walls 30 and 31 and this, in conjunction with the guide channels 19, ensures that the film is maintained straight and taut across the opening 22 while the projector is not in use and when the cassette is removed from the projector, as described in U.S. Patent 3,281,-199, dated Oct. 25, 1966. When the lever 29 is swung to its engaged position the pressure roller 25 presses the film against the driving capstan 24 and the film is drawn past the magnetic head 23 by rotation of the capstan 24. The edge guide 26 serves to guide the edge of the film so that the magnetic sound track on the film runs past the head 23 at the correct height.

The film 15 passes one side of the sprocket 17 in its travel towards the film gate 16 and the other side of the sprocket 17 on its return from the film gate. It is held against the sprocket by the guide rollers 18 so that the teeth of the sprocket engage the perforations in the edges of the film. The sprocket 17 is rotated by mechanism to be described and feeds the film towards and away from the film gate 16 while maintaining a loop of constant length between the two sides of the sprocket.

The film is advanced through the film gate 16 intermittently by a claw 32 which passes through a slot in the wall of the cassette to engage the perforations at one edge of the film. The mechanism operating the claw 32 will be described in more detail below.

The reflector 28 includes a prism 33 (see FIG. 3) which directs light from a projection lamp 34, concentrated by a condenser 35, through the film gate. A spherical reflector 36 is placed behind the lamp 34. The lamp 34, condenser 35, and reflector 36 are carried by a bracket 37 which is attached to a hinged flap 38 normally resting in the plane of the deck 11 but capable of being lifted to the position shown in FIG. 4 to give access to the lamp. The light from the film gate 16 passes through a projection lens system 39 (FIGS. 1 and 3) and by way of a prism 40, a reflector 41 and a reflector 42 (FIG. 3) to a back-projection screen (not shown). The lens system 39 has a focus-adjusting lever 43. A rotary shutter 44 (FIGS. 1, 3 and 4) is disposed between the film gate 16 and the lens system 39.

FIG. 2, which shows the deck 11 from below, shows the mechanism by which drive is transmitted to the take-up bobbin, the driving capstan and sprocket, the shutter and the claw. Separate motors 45 and 46 are provided for the bobbins 14 and 13, one or other of the motors being energised to give forward or reverse movement of the film. The motors 45 and 46 drive the bobbins through electrically operated clutches (not shown) and a friction drive to splined spindles which engage in internally splined hubs of the bobbins. When the cassette is placed in position on the deck one or the other splined spindle is engaged with the sub of its bobbin to enable that bobbin to act as the take-up bobbin while the other spindle is held in the disengaged position to avoid drag on the bobbin from which the film is being drawn.

The other drives are obtained from a single synchronous motor 47. The motor 47 is a Papst synchronous electric motor having an external rotor which gives a flywheel action and a steel spindle projecting at each end of the motor. One end 48 of the spindle of the motor 47 drives the capstan 24 (FIG. 3) through an idler wheel 49 and a friction wheel 50. The wheel 50 has a rim of hard synthetic rubber and is fixed to the shaft of the capstan 24, which also carries a flywheel 51. The idler wheel 49 is composed of hard synthetic rubber which gives good frictional grip on the metal spindle of the motor 47 and on the friction wheel 50. The idler wheel 49 is carried on an adjustable arm 52 which is biassed by a spring towards engagement of the idler wheel 49 with the end 48 of the spindle and the friction wheel 50.

The other end 53 of the spindle of the motor 47 is coupled through an electro-magnetic clutch 54 to a toothed wheel 55 coupled to a toothed belt 56 to a toothed wheel 57. A helical gear 58 rotating with the wheel 57 drives a helical gear 59 fixed to a shaft 60. An electromagnetic brake 61 is mounted on the shaft 60. The shaft 60 drives a cross-shaft 62 which carries a contact drum 63 cooperating with two sets of contacts 64 and 65 connected in the circuits of the clutch 54 and the brake 61, respectively. The shaft 60 is coupled to a shaft 70 driving the shutter 44 and claw 32 by a toothed belt 66. The contact drum 63 ensures that the brake 61 only stops the shaft 60 in a position in which the claw 32 is fully disengaged from the film. At this position the circuit of the brake 61 is completed through the contacts 65 and the circuit of the clutch 54 is broken between the contacts 64. At other positions of the contact drum 63 the clutch 54 is held in partial engagement to enable the drum to be advanced to the position where the brake is engaged.

The shaft 70 carries a worm 71 which drives a gear 72 which is fixed to the same spindle as a pinion 73. The pinion 73 drives a gear 74 which in turn drives a gear 75. The gear 75 has two diametrically-opposed axially-extending pegs 75a on its upper surface. A disc 76 attached to a spindle 78 carrying the driving sprocket 17 has two similar pegs 76a on its lower surface. The pegs 75a and 76a are interconnected by four coil springs 77 arranged in a square array and each coupling one of the pegs 75a to one of the pegs 76a. A resilient coupling is thus formed between the gear 75 and the spindle 78. The shaft 70 also drives, through a similar resilient coupling formed between a disc 80 and a disc 81 by springs 82, a shaft 83 which transmits drive to the shutter and the claw mechanism.

The shaft 83 carries a worm 84 driving a pinion 85 which rotates a spindle 86 having at its upper end a cam 87 (FIGS. 1 and 5). The cam 87 is disposed in a square aperture in a claw arm 88 carrying the claw 32. The claw arm 88 has a slot 89 mounted on a pin 90 to allow angular movement of the rm 88 and limited translational movement. Upon rotation of the cam 87 it engages the four sides of the square aperture in succession and imparts a substantially square movement to the claw 32. The cam 87 has an arcuate portion 91 concentric with the axis of the spindle 86 which maintains the displacement of the claw constant in one direction while the engagement of a corner 92 of the cam with the adjacent side of the square aperture is effecting displacement in the direction at right angles. The pin 90 is held in position by a spring which allows the pin to be displaced by movement of the claw arm 88 should the claw 32 strike an obstruction.

The pinion 85 is carried by a spindle 97 which is coupled to the cam spindle 86 by an eccentric drive including a disc 98 on the spindle 97 having a pin 99 which engages a slot 100 in an arm 101 attached to the spindle 86. By this means an accelerated motion is applied to the claw 32 by the cam 87 for the pull-down of the film. This coupling also allows the claw mechanism to be displaced slightly to correct any inaccuracy in the positioning of the frames of the film relative to the sprocket holes.

The shaft 83 carries a toothed wheel 93 which is coupled by a toothed belt 94 to a toothed wheel 95 on a spindle 96 which carries the shutter 44. The shutter 44 (FIG. 4) is in the form of a rotating disc with recesses in its periphery which allow the light to pass from the film in the film gate 16 to the projection lens system 39 during part of each rotation of the disc when a frame of the film is stationary in the film gate, the light being interrupted while the film is moved by the claw 32 to a new frame.

The controls for the operation of the projector include a rotary on/off mains switch and a rotary forward and reverse switch. When the mains switch is moved to the on-position it completes the circuits to the main motor 47, the forward take-up motor 45 and the amplifiers connected between the magnetic head 23 and any convenient sound reproduction system (not shown). At the same time a cam on the spindle of the rotary mains switch moves the spring-loaded lever 52 to engage the idler wheel 49 with the end 53 of the motor spindle and with the wheel 50, thus setting the capstan 24 in rotation. The spring pressure holding the idler wheel 49 in engagement can be adjusted to give the desired slip between the idler wheel and the motor spindle. The mains switch can also switch on the blower fan where one is fitted to cool the apparatus, particularly to remove the heat generated by the projection lamp.

When the forward and reverse switch is moved from a neutral position to its forward position it closes the circuits to the clutch 54 and to the clutch coupling the motor 45 to the take-up spool 14. The film is thus set in motion by the movement of the claw 32, the sprocket 17, and the take-up spool 14. At the same time the lamp 34 is switched on and a safety shutter (not shown) is withdrawn by the energisation of a solenoid since the shutter 44 has been set in rotation by the engagement of the clutch 54. A cam on the spindle of the forward and reverse switch moves the spring-loaded lever 29 to the on-position to press the film against the driving capstan 24 and the magnetic head 23 and initiate sound reproduction.

The dimensions of the members coupling the film sprocket and capstan to the motor and the diameters of the film sprocket and capstan are so chosen that the peripheral speed of the capstan when free of the film is slightly higher than that of the driving sprocket. The capstan therefore holds the film under slight tension when drawing it past the sound head from the sprocket but any tendency to rotate the sprocket faster than it is being driven is taken up firstly by the resilient coupling in the sprocket drive and secondly by the slip which occurs between the motor shaft and the idler roller. The result is to produce exact synchronism between the film sprocket and the capstan and movement of the film past the magnetic head at a uniform speed.

The forward and reverse switch is biassed towards its neutral position but when moved to the forward position is held there by a solenoid. The solenoid is de-energised and the switch released to return to its neutral position either by depression of a key switch by the operator or automatically when the end of the film is reached and a strip of metal foil on the film completes an electrical circuit. For this purpose the rollers 21 are formed of electrically insulating material and have conducting rings at their upper and lower ends which are bridged by the metal foil on the film. One of the rings is connected to a central conducting spindle of the roller which, when the cassette is in position, rests on a spring-loaded contact pin mounted on the deck and connected to the control circuits. Connection to the other ring is made through the metal casing of the cassette.

When the forward and reverse switch is in its neutral position the clutches are open, the lamp is out, the safety shutter is closed, the rotating shutter and the claw are out of operation, and the pressure roller or pinch wheel is disengaged. A slug relay holds the circuits closed for a short period after the movement of the forward and reverse switch to the neutral position in order to ensure that the shutter and claw stop in the correct positions, the claw being completely disengaged from the film and cassette. When the switch is now turned to its reverse position the main motor is reversed, the reverse take-up motor 46 is energised, and the clutches of the main motor and the motor 46 are engaged. The sound is switched off and the film is run backwards until the switch is released by the operator and allowed to return to neutral.

To allow the projector to stop at one frame of a film for examination, a key switch is provided which moves a heat filter into position between the lamp and the film, disengages the clutch of the main motor and engages the brake to stop the claw, sprocket, and rotary shutter but holds the safety shutter open, and partially disengages the pressure roller. The forward take-up motor continues in operation, the friction drive slipping after any loose film has been taken up. When the key switch is released the actions described are reversed and the projection of the film continues.

The heat filter may be a Chance glass filter with one surface ground to diffuse the light. It is found that this grinding of the surface produces a marked reduction in the heating of the film while allowing a good projected image to be obtained. The projection system preferably includes a permanent heat filter which may be a dichroic mirror, for example, taking the place of the reflector 28, or a screen with a finely-dispersed metal coating which allows the passage of light but reflects infra-red radiation.

The film in the cassette carries two film tracks side by side running in opposite directions. On completion of one track the cassette can be inverted to project the other.

The cassette contains a spring-loaded brake block 102 which engages the periphery of the sprocket 17 when the cassette is removed from the deck to lock the position of the film. The brake block 102 is disengaged by a locking pin 103 acting upon a lever 104. The flanged locking pin 103 slides into a groove 105 in the lower wall of the cassette to lock the cassette in position on the deck. The movement of the pin 103 can be interlocked with the on/off mains switch to ensure that operation cannot commence until the cassette has been locked in the correct position.

I claim:
1. Ciné apparatus comprising a sound head, a film-driving sprocket before the head, a driving capstan after the head, means for pressing the film against the driving capstan, a motor for driving said sprocket and said capstan, a resilient coupling coupled between the motor and the sprocket, and transmission means coupling said motor to said capstan, said transmission means including two rotary transmission elements in peripheral frictional engagement and being constructed to drive the capstan at a peripheral speed higher than that of the driving sprocket in the absence of the film, and said frictional engagement allowing slip whereby exact synchronism between the sprocket and the capstan is achieved.

2. Apparatus as claimed in claim 1 wherein one of said transmission elements is a shaft of the motor which rotates at high speed and the other is an idler wheel having a peripheral surface of a material with a high co-efficient of friction.

3. Apparatus as claimed in claim 1 wherein said resilient coupling comprises two rotary members having a common axis of rotation, a pair of diametrically-opposed pegs projecting towards the other member parallel to said axis, and four coil springs arranged in a square array and each coupling one peg of one member to one peg of the other member.

4. Apparatus as claimed in claim 1 including a film gate, a pull-down mechanism for drawing the film through said film-gate, and a shutter, said pull-down mechanism and said shutter being both driven by said motor.

5. Apparatus as claimed in claim 4 including a common clutch and brake controlling the drive to the sprocket, pull-down mechanism and shutter independently of the drive to the capstan.

6. Apparatus as claimed in claim 5 including an electrical control circuit for said clutch and brake, a controlling switch for controlling the drive to the sprocket, pull-down mechanism, and shutter, a contact drum coupled to the output side of said clutch, and contacts in said control circuit co-operating with said contact drum to ensure continued engagement of the clutch after operation of the controlling switch until the pull-down mechanism is out of engagement with the film, and thereafter to effect disengagement of the clutch and engagement of the brake.

7. Apparatus as claimed in claim 1 including a removable reversible cassette containing bobbins for the film, a film gate, and the driving sprocket, and provided with openings for the entry of the sound head, the driving capstan, a driving element engaging the sprocket, a part of the optical system for projection of the film in the film gate, and a claw for drawing the film intermittently through the film gate.

8. Ciné apparatus comprising a film gate, film pull-down mechanism for advancing the film intermittently through the film gate, said mechanism comprising a film-engaging claw, a driving element coupled to said claw, a square aperture in said driving element, and a rotary cam engaging the sides of said aperture to impart a substantially square movement to the claw, a sound head, a film-driving sprocket before the head, a driving capstan after the head, means for pressing the film against the driving capstan, a motor for driving said sprocket and said capstan, a resilient coupling coupled between the motor and the sprocket, and transmision means coupling said motor to said capstan, said transmission means including two rotary transmission elements in peripheral frictional engagement and being constructed to drive the capstan at a peripheral speed higher than that of the driving sprocket in the absence of the film, and said frictional engagement allowing slip whereby exact synchronism between the sprocket and the capstan is achieved.

9. Ciné apparatus as claimed in claim 8 including a removable cassette containing bobbins for the film, the film gate, and the driving sprocket, and provided with openings for the entry of the sound head, the driving capstan, and the film-engaging claw, the apparatus including a sprocket-driving element engageable with the sprocket in the cassette and an optical system for projection of the film including means projecting into said cassette to direct light through the film gate.

10. Ciné apparatus comprising a sound head, a film-driving sprocket before the head, a driving capstan after the head, means for pressing the film against the driving capstan, an electric motor having an output shaft, an idler roller in peripheral frictional engagement with said output shaft, a wheel in peripheral frictional engagement with the idler roller, a shaft on which said driving capstan and said wheel are mounted, a pivoted arm carrying said idler roller, spring means biassing the idler roller into engagement with the output shaft of the motor and with the said wheel, and a resilient coupling coupled between said motor and said driving sprocket, said coupling comprising two rotary members having a common axis of rotation, a pair of diametrically-opposed pegs projecting towards the other member parallel to said axis, and four coil springs arranged in a square array, and each coupling one peg of one member to one peg of the other member, said idler roller and said wheel having radii such that the peripheral speed of said driving capstan in the absence of a film is greater than the peripheral speed of said driving sprocket and said frictional engagement between the idler wheel and the motor shaft being such as to allow slip whereby the peripheral speeds of the sprocket and capstan are equalised when the film is driven.

11. Apparatus as claimed in claim 10 including a cassette containing bobbins for the film, a film gate and the said driving sprocket, said sprocket being arranged to feed the film towards and away from the film gate, drive means extending into said cassette to engage said sprocket, a pull-down mechanism for advancing the film intermittently through said film gate, said mechanism comprising a film-engaging claw, a pivoted lever carrying said claw and slidable with respect to said pivot, a square aperture in said lever and a rotary cam engaging in said aperture to cause said claw to execute a substantially square movement, a rotary shutter, a drive shaft coupled to said rotary cam and said shutter, an electrically-operated clutch having an input shaft driven by said motor and an output shaft driving said sprocket through said resilient coupling, an electro-magnetic brake acting on said output shaft, a second resilient coupling coupled between said output shaft and said drive shaft for the cam and shutter, an electrical control circuit for said clutch and brake, a controlling switch, a contact drum coupled to said output shaft, and contacts in said control circuit co-operating with said contact drum to ensure continued engagement of the clutch after operation of the controlling switch until the pull-down mechanism is out of engagement with the film, and thereafter to effect disengagement of the clutch and engagement of the brake.

12. Ciné apparatus as claimed in claim 8 in which said driving element is a pivoted lever slidable with respect to said pivot in a direction parallel to one pair of sides of the aperture and swingable about the pivot by engagement of the cam with the said sides, and in which the claw is carried by said lever and extends transverse to the lever to engage in and disengage from the film perforations by the swinging movement of the lever and advance the film by the straight line sliding movement of the lever.

References Cited

UNITED STATES PATENTS

| | | | |
|---|---|---|---|
| 940,275 | 11/1909 | Pink et al. | 352—196 |
| 1,210,323 | 12/1916 | Janssens | 352—16 |
| 2,095,831 | 10/1937 | Philips | 352—15 |
| 2,625,073 | 1/1953 | Young et al. | 352—123 |
| 2,988,954 | 6/1961 | Kuhnert et al. | 352—16 |
| 3,022,707 | 2/1962 | Platt. | |

FOREIGN PATENTS

| | | |
|---|---|---|
| Ad. 9,461 | 9/1908 | France. |
| Ad. 33,496 | 5/1928 | France. |

JULIA E. COINER, *Primary Examiner.*

U.S. Cl. X.R.

352—15, 194